Nov. 28, 1961 D. H. MacPHERSON 3,011,156

INFORMATION STORAGE ARRANGEMENT

Filed May 28, 1959 2 Sheets-Sheet 1

INVENTOR
D. H. MacPHERSON
BY
R. C. Winter
ATTORNEY

Nov. 28, 1961 D. H. MacPHERSON 3,011,156

INFORMATION STORAGE ARRANGEMENT

Filed May 28, 1959 2 Sheets-Sheet 2

INVENTOR
D. H. MACPHERSON
BY
R. C. Winter
ATTORNEY

United States Patent Office 3,011,156
Patented Nov. 28, 1961

3,011,156

INFORMATION STORAGE ARRANGEMENT

Donald H. MacPherson, New Shrewsbury, N.J., assignor to Bell Telephone Laboratories, Incorporated, New York, N.Y., a corporation of New York Filed May 28, 1959, Ser. No. 816,461
11 Claims. (Cl. 340—173)

This invention relates to apparatus for the storage of binary information and more particularly to such apparatus employing capacitors as the storage elements.

Various arrangements are known in the art for storing binary information in passive elements. These arrangements commonly store such information by establishing one particular condition relative to an element which corresponds to one binary digit and another such condition corresponding to a second binary digit.

It is desirable in cases where information is to be stored over a long period of time to be able to reproduce such information reliably. Moreover, it is advantageous to be able to change with minimum difficulty, when necessary, the information which is stored. Many of the known arrangements for storing information do not combine these two features of substantially permanent storage and ease in changing the stored information. Those known arrangements which combine permanent storage with ease in changing the stored information do so at the expense of increased complexity of equipment and with a corresponding increase in cost of equipment and maintenance.

Information storage systems have been disclosed which utilize capacitors to store charge thereon. In these systems the presence or absence of charge stored on a capacitor corresponds to the respective information states. Such charge storing arrangements are usually unsatisfactory for storing information over any considerable length of time because of the leakage of charge through the dielectric material and other paths.

It is an object of this invention to provide a simple, reliable and economical arrangement for storing information in a capacitive matrix.

A more specific object of this invention is to provide such an arrangement capable of storing information reliably for an indefinite time.

A further object of this invention is to provide an arrangement for permanently storing binary information in which the change of such information may be readily effected.

It should be emphasized that the instant invention is not concerned primarily with the charging of a capacitor to represent stored information. Rather, this invention provides for the location of capacitive couplings at selected positions in a matrix, thus representing a particular binary digit by the presence of such a coupling at a particular point. Such a storage system wherein the presence or absence of a capacitor at a particular point in a matrix determines the stored information is disclosed in E. R. Kretzmer application, Serial No. 816,451, filed May 28, 1959. These capacitive couplings are determined in the structures embodying my invention in a fashion which permits the simple removal of a portion of the storage matrix and the substitution therefor of a replacement section representing different information. Thus, this invention provides for the permanent storage of binary information so long as such storage is desired. However, when this information is to be changed such a change may be readily effected.

In one specific embodiment of this invention, a plurality of capacitors are fabricated on a dielectric sheet. The plates representing one side of each of these capacitors may be deposited on an insulating board in accordance with techniques known in the art. Common connections to groups of these plates arranged in columns may be provided through holes in the board. The capacitor dielectric is formed by laying an adhesively-coated insulating film over these plates. On top of this is placed a sheet of copper which, after bonding, is etched selectively to leave tabs on top of the insulating film in registration with the tabs on the under side. Since the insulating film is a material having a high dielectric constant, a number of capacitors are provided, each consisting of a pair of plates and a dielectric, with connections to one plate of each capacitor.

The circuit of each capacitor is completed by providing a connection to the upper plate thereof. Information is stored in the above-described matrix array of capacitors in accordance with the existence or lack of a circuit connection to a capacitor. The connections to the upper plates of the individual capacitors in accordance with my invention are provided by a plurality of conductors of a resilient material which are fabricated in groups corresponding to the rows of the capacitor matrix. The entire matrix array is assembled in a box-like structure, the upper side of which comprises a number of channels corresponding to the rows of the matrix. The upper plate connectors are set in T-shaped mounting members which in turn are fitted within the channels of the matrix assembly. Thus the insertion of a T-shaped member in its channel provides preselected connections with the capacitors of the corresponding matrix row and permits the storage or replacement of information one row at a time. Advantageously, the unit is fabricated with resilient contact fingers provided at all capacitor positions; thereafter, selected contact fingers may be severed to leave the desired connections.

It is therefore apparent that the stored information may readily be changed, on a row-at-a-time basis, by the removal of one specific mounting member and its replacement by another similar mounting member having a different arrangement of resilient fingers contacting the upper plates of certain of the individual capacitors of the array.

Accordingly in embodiments of this invention, the existence of a circuit connection to a capacitor corresponds to the storage of a binary "1" at that point of the matrix while the absence of such a connection corresponds to the storage of a binary "0." Equipment for interrogating the matrix and sensing the existence of capacitive couplings at specific points therein is also provided.

It is a feature of this invention that a capacitive storage matrix have connections selectively made to the individual capacitors thereof in accordance with the information to be stored in the matrix.

It is a further feature of this invention that the connections to particular capacitors of a capacitive storage matrix be provided by resilient conductors positioned adjacent the corresponding capacitors.

A further feature of this invention is the elimination of capacitive couplings at predetermined positions in a capacitive matrix by cutting corresponding conductors of a universal matrix row connector.

An additional feature of this invention is the provision of a structure which supports a row of conductors making contact with one side of the capacitors in a capacitive matrix row so that the information represented by the capacitive connections in the matrix may be changed on a row-at-a-time basis.

A complete understanding of this invention and of these and various other features thereof may be gained from the following detailed description and the accompanying drawing, in which.

Figure 1:
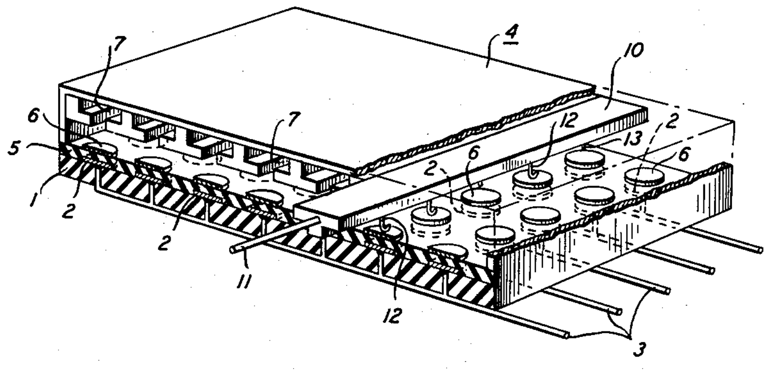
FIG. 1 depicts a perspective view of one specific illustrative embodiment of my invention, a portion of the housing being broken away to show the internal structural details more clearly.

FIG. 1 depicts a perspective view of a structure representing one specific illustrative embodiment of my invention. A portion of this figure has been cut away to show the structural configuration more clearly. An insulating sheet 1 with conducting tabs 2 thereon is shown as the bottom portion of a box or housing member 4. This insulated sheet 1 can best be seen by itself in FIG. 2 and, as there shown, the plurality of conductive tabs 2 are positioned on the sheet in a uniform array. These tabs may be placed on the insulating sheet 1 as is known in the art. For example, one way of providing this arrangement is to bond a conducting layer such as copper to an insulating sheet. After suitable masking the copper is etched away, leaving the tabs 2 which are protected from the etchant by masking.

Figure 2:
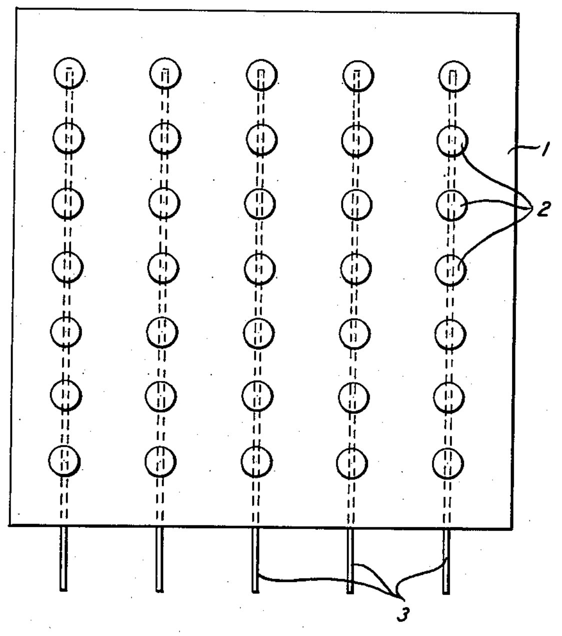
FIG. 2 depicts a portion of the structure of FIG. 1.

In FIG. 2, all of the tabs 2 in any one column are connected together by a conductor 3 which is positioned on the opposite side of the insulating sheet 1 from the tabs 2. Connections between the column conductors 3 and their associated tabs 2 are provided through holes in the insulating board 1.

Referring again to FIG. 1, on top of the sheet 1 is shown a layer 5 which covers the tabs 2 and on the other side of which is deposited a plurality of upper tabs 6 respectively opposite their corresponding lower tabs 2. Since the tabs 2 and 6 are of a conducting material and the layer 5 situated between the tabs 2 and 6 is of an insulating material having a high dielectric constant, it can be seen that this arrangement provides a plurality of individual capacitors with connections to one plate of each capacitor in the structure. Each conductor 3 is connected to an associated column of such capacitors to define column electrodes of the resulting capacitive matrix. Positioned at right angles to the conductors 3 are a number of channels 7 formed along the upper side of the box 4 in alignment with corresponding rows of individual capacitors.

A T-shaped mounting member 10 is insertable into each of the channels 7; for purposes of clarity only one such mounting member 10 is depicted in FIG. 1. The mounting member 10 itself can best be seen in FIG. 3. As clearly seen in this figure, the member 10, which may be of insulating material, contains a conductor 11 to which are attached a plurality of conductors 12 and 13 formed of a resilient material. The ends of the conductors 12 are U-shaped to facilitate the passage of these conductors over the tabs 6 of FIG. 1 as the member 10 is slid in or out of its channel 7.

Figure 3:
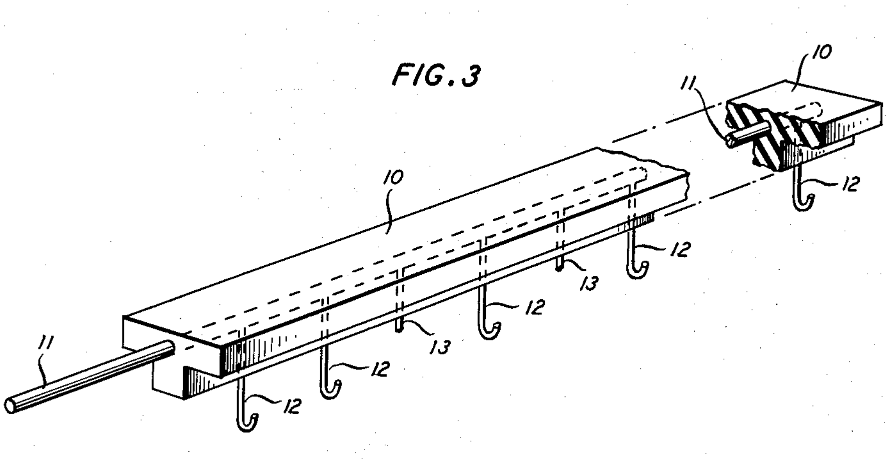
FIG. 3 depicts a mounting member for the resilient conductive fingers as employed in the embodiment of FIG. 1.

In FIG. 3 there are shown two conductors 13 which have their lower ends cut off. When the member 10 is positioned in its corresponding channel 7 of FIG. 1, in accordance with an aspect of my invention, contact is made between the conductors 12 and their respective tabs 6. Thus at each one of these points a capacitive coupling is established between the row conductor 11 and the respective column conductor 3.

Since there is no connection between a conductor 13 and its respective capacitor, no capacitive coupling exists between the row conductor 11 and the column conductors 3 opposite the severed conductors 13. Therefore, in accordance with the instant invention as has been outlined hereinabove, information is stored in the arrangement of FIG. 1 by severing the normally provided connections from a row of conductor 11 to the plates of preselected capacitors of the storage matrix. Since an individual member 10 may be removed from its corresponding channel 7, the system in accordance with my invention displays the advantage that information, while normally stored on a permanent basis, may be readily changed a row at a time without requiring a complete replacement of all the information stored in the matrix.

Figure 4:
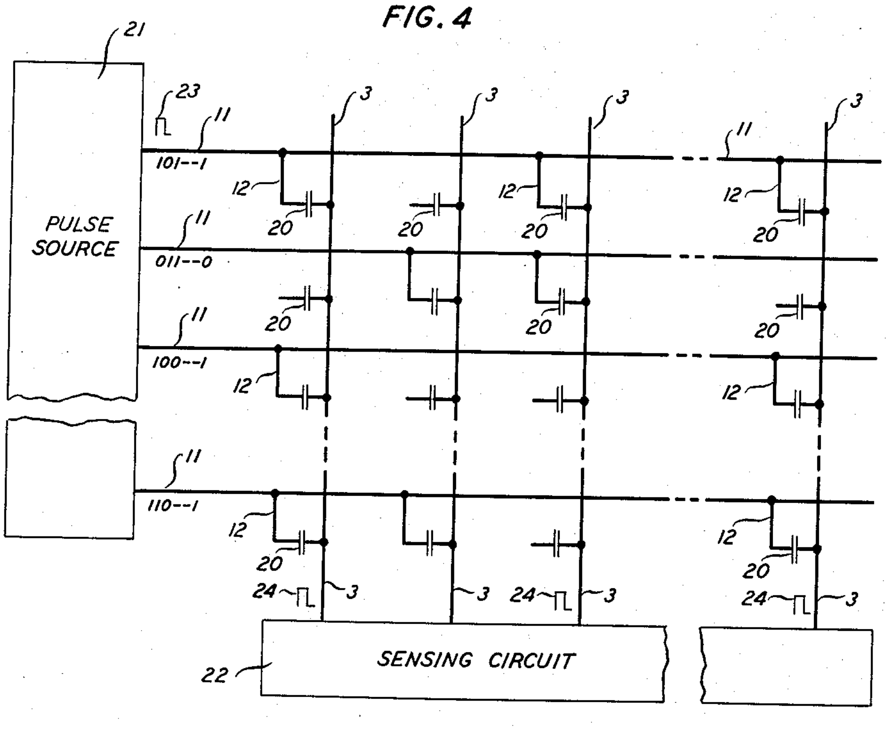
FIG. 4 is a schematic representation of the matrix of FIG. 1 together with associated circuitry for sensing the stored information.

The circuit of FIG. 4 illustrates the operation of the matrix in accordance with my invention. The depicted capacitive matrix has row conductors 11, column conductors 3 and a plurality of capacitors 20. Each of the capacitors 20 is shown connected to a corresponding column conductor 3. However, only certain ones of the capacitors 20 are connected to a corresponding row conductor 11. The missing connections correspond to the positions of the severed conductors 13 of FIG. 3. Thus, capacitive couplings are provided only between certain row and column conductors through those capacitors 20 having connections to both of a pair of row and column conductors.

The matrix, illustrated in FIG. 4, has been processed to store particular information. Thus, the top row of the matrix of FIG. 4 has stored therein the binary number 101 – – 1, the next row, 011 – – 0, et cetera.

In the process of reading information out of the matrix, pulses advantageously are applied selectively to the row conductors 11 by the pulse source 21 connected thereto. A pulse on a particular row conductor 11 is transmitted to those column conductors 3 to which capacitive couplings are provided. The sensing circuit 22 connected to the column conductors 3 thereupon detects pulses or their absence, indicating the binary number stored in the particular row being pulsed. As an example, in FIG. 4 a pulse 23 is shown applied to the top row conductor 11, thus producing pulses 24 at the first, third, and last column conductors 3. The sensing circuit 22 reads these pulses 24 as the binary number 101 – – 1 which is the number stored in the top row of the matrix.

Whenever the information stored at a particular level in the matrix is to be changed, all that is required is the removal of the particular row conductor corresponding to that level and the substitution therefor of a new conductor having a pattern of capacitor contactors which represents the new information to be stored.

It is to be understood that the above-described arrangements are illustrative of the principles of the invention. Numerous other arrangements may be devised by those skilled in the art without departing from the spirit and scope of the invention.

What is claimed is:

1. An information storage matrix comprising a layer of dielectric material, a plurality of first and second conducting means connected to opposite sides of said layer to form a plurality of capacitors in a defined coordinate array, means for connecting pluralities of said first conducting means in common to define columns of said matrix, means for selectively connecting certain ones of said second conducting means in common to define rows of said matrix, and means connected to said matrix rows and columns for sensing the existence of individual capacitive couplings therebetween.

2. An arrangement for storing information in a matrix comprising a plurality of capacitors in a defined coordinate array each consisting of a pair of conducting plates on opposite sides of a dielectric sheet, first means for connecting said plates on one side of said dielectric sheet in columns, channeling means positioned on the opposite side of said dielectric sheet in alignment with rows of said capacitors, and second means including predetermined length conductors removably positioned in said channeling means for providing connections to preselected ones of said capacitor plates on the opposite sides of said dielectric sheet in accordance with the information to be stored in said matrix.

3. An arrangement for storing information in accordance with claim 2 further comprising means for reading such information from said matrix including interrogating means connected to said second connecting means, and sensing means connected to said first connecting means.

4. An information storage matrix comprising a plurality of capacitors arranged in rows and columns, first conducting means connected to one side of said capacitors in the respective columns, second conducting means connected to the other side of selected ones of said capacitors in the respective rows, said second conducting means including means for contacting only preselected capacitors in a row in accordance with the information to be stored in said matrix, and means for holding said contacting means adjacent said capacitors connected thereto including a removable member for permitting the replacement of said information stored in only one row, readout means for applying signals selectively to said second conducting means, and sensing means for detecting the existence of capacitive couplings between said first conducting means and said second conducting means to which a signal is applied.

5. An information storage matrix in accordance with claim 4 wherein said contacting means comprises a plurality of resilient fingers in spatial correspondence with the capacitors of a corresponding row.

6. An information storage arrangement in accordance with claim 4 wherein said holding means further comprises a slotted channel structure and said removable member comprises a T-shaped insulating element carrying said second conducting means.

7. An arrangement for storing binary information comprising a plurality of capacitors in a defined coordinate array each having a connection thereto at one plate only, conducting means connected to columns of said capacitors at said plate connections, means for providing contact connections to predetermined ones of the unconnected plates of said capacitors, said last-mentioned means comprising a plurality of individually removable row conductors and means for positioning said conductors opposite corresponding rows of said capacitors, means for applying interrogation signals to successive ones of said row conductors, and sensing means connected to said column conductors for detecting the existence of capacitive couplings between said column conductors and said row conductor currently receiving said interrogation signals.

8. An information storage matrix comprising a plurality of capacitors arranged in rows and columns, first means for connecting one side of each capacitor in the respective columns, second means for connecting the other side of selected ones of said capacitors in the respective rows, and information readout means comprising a signal source and output sensing means connected to corresponding ones of said first and second connecting means for determining the information stored in said matrix.

9. An information storage matrix in accordance with claim 8 wherein said second connecting means comprises conducting means and means for positioning said conducting means in contact with said selected ones of said capacitors.

10. An information storage matrix in accordance with claim 9 wherein said positioning means comprises a channel guide corresponding to each of said rows of capacitors and affixed adjacent the corresponding row and wherein said conducting means comprises a channel member for insertion in said channel guide, said channel member having a conductor affixed lengthwise therein and a plurality of resilient conductive members affixed at right angles to said conductor at selected intervals along said conductor.

11. A capacitor information storage matrix comprising a dielectric sheet, a first plurality of conductive discs mounted on one side of said sheet in a coordinate array, a plurality of first conductor means connecting said discs in one coordinate of said matrix electrically together, a second plurality of conductive discs mounted on the other side of said sheet, one disc of said second plurality being opposite each disc of said first plurality and defining therewith an individual capacitor, a housing member for said dielectric sheet, means defining channels in said housing member facing said other side of said sheet, a mounting member removably positioned in each of said channels, resilient conductive fingers extending from each of said mounting members for selective engagement individually with only certain of said discs on said other side of said sheet in accordance with the information stored in said matrix, and second conductor means connected to said resilient fingers for connecting said certain discs on said other side of said sheet electrically together in the other coordinate of said matrix.

References Cited in the file of this patent

UNITED STATES PATENTS 2,872,664 Minot ---------------- Feb. 3, 1959

Disclaimer 3,011,156.—*Donald H. MacPherson*, New Shrewsbury, N.J. INFORMATION STORAGE ARRANGEMENT. Patent dated Nov. 28, 1961. Disclaimer filed Feb. 1, 1966, by the assignee, *Bell Telephone Laboratories, Incorporated*.

Hereby enters this disclaimer to claims 1 and 8 of said patent.

[*Official Gazette May 31, 1966.*]